(12) United States Patent
Lovett

(10) Patent No.: US 6,647,920 B2
(45) Date of Patent: Nov. 18, 2003

(54) REACH EASY POLE

(76) Inventor: Jason K. Lovett, 102 Fox Rd., Griffin, GA (US) 30224

( * ) Notice: Subject to any disclaimer, the term of this patent is extended or adjusted under 35 U.S.C. 154(b) by 0 days.

(21) Appl. No.: 10/052,954

(22) Filed: Jan. 23, 2002

(65) Prior Publication Data

US 2003/0136346 A1 Jul. 24, 2003

(51) Int. Cl.$^7$ .............................. A01K 39/00
(52) U.S. Cl. ............................ 119/52.2; 119/57.8
(58) Field of Search ................. 119/52.2, 52.3, 119/53, 57.8, 57.9, 68, 428, 429, 432, 461; 116/173; 52/116

(56) References Cited

U.S. PATENT DOCUMENTS

| | | | | |
|---|---|---|---|---|
| 1,102,413 A | * | 7/1914 | Jensen | 116/173 |
| 3,301,217 A | * | 1/1967 | Prowinsky | 119/57.9 |
| 3,696,792 A | * | 10/1972 | Bruhns | 119/432 |
| 3,792,680 A | * | 2/1974 | Allen | 116/173 |
| 4,149,347 A | * | 4/1979 | Boemer | 52/116 |
| 5,063,877 A | * | 11/1991 | Riggi | 119/52.2 |
| 5,339,767 A | * | 8/1994 | Krag | 119/57.8 |
| 5,664,522 A | * | 9/1997 | Keller | 119/52.3 |
| 5,782,042 A | * | 7/1998 | Klein | 52/116 |
| 5,975,015 A | * | 11/1999 | Runyon et al. | 119/52.2 |
| 6,305,320 B1 | * | 10/2001 | Fore | 119/52.3 |
| 6,386,142 B1 | * | 5/2002 | Holscher et al. | 119/57.8 |
| 6,427,629 B1 | * | 8/2002 | Lush | 119/52.2 |

* cited by examiner

*Primary Examiner*—Charles T. Jordan
*Assistant Examiner*—Elizabeth Shaw
(74) *Attorney, Agent, or Firm*—James R. Lane

(57) ABSTRACT

A bird feeder pole constructed from a ground post, and a swing arm. One end of the ground post is set into the ground, the other end has the swing arm rotatably attached to it. The swing arm includes leverage means on one side of the pivot and the bird feeder support on the other side of the pivot, which results in a balanced arrangement and gives the user added leverage and control when rotating the swing arm.

2 Claims, 1 Drawing Sheet

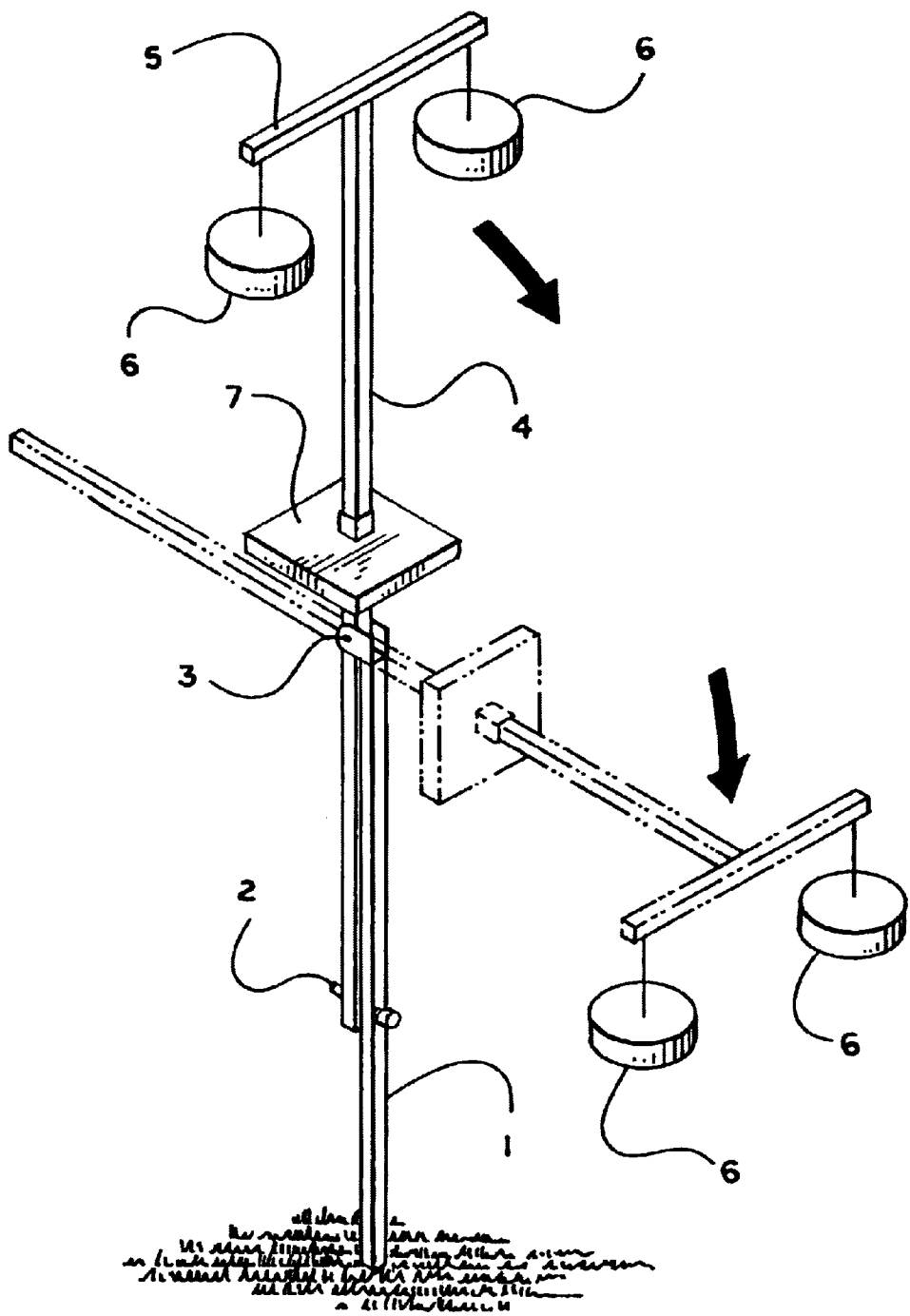

REACH EASY POLE

BACKGROUND OF THE INVENTION

1. Field of the Invention

The present invention relates, in general, to a pole used to support a bird feeder. The pole pivots to allow the user to easily gain access to the bird feeder so as to facilitate refilling and maintenance.

2. Description of the Prior Art

Generally bird feeders hang from a tree or other object, or are affixed to a solid pole which is set permanently into the ground. In order to refill or clean such feeders it is usually necessary to use a ladder. Normally no object is available to steady and support a ladder. Reaching the necessary height on an unsteady ladder can be precarious at best and hazardous at worst.

Some feeder poles use a telescoping mechanism which allows the user to raise and lower the pole and more easily access the feeder itself These are usually bulky devices which require the user to use a large amount of muscle power to accomplish the task. Other prior art devices swivel down, but the user must bear the entire weight of the totally unbalanced arrangement while it swivels down.

BRIEF SUMMARY OF THE INVENTION

The present invention provides a bird feeder pole comprising a first pole to be fixed to the ground, and a second pole pivoted to the first for supporting the bird feeder. A leverage means carried by the second pole provides control so a user can control the rotation of the feeder at all times.

BRIEF DESCRIPTION OF THE DRAWINGS

The single figure is a perspective view of one preferred embodiment of the invention.

DETAILED DESCRIPTION OF THE PREFERRED EMBODIMENT

A preferred embodiment of this invention is shown in the drawing. The specific description of each specific element should be interpreted to include all technical equivalents.

The device of the present invention includes a ground post 01 which has a first end embedded in the ground. The second end protrudes above the ground. The second end has a clevis 03 attached to it. Clevis 03 is formed from two pieces of metal that are welded to the second end of ground post 01, and holes are. formed in each piece of metal to receive a pin therethrough. Other devises and like arrangements are possible, and are well known to those skilled in the art.

The device of the present invention also includes a swing arm 04. The middle area of the swing arm 04 has a hole in it for attaching to the clevis 03 in such a manner that the swing arm 04 can be selectively rotated about the clevis 03. The swing arm 04 has a first end that acts as a leverage means, this leverage means being the area between the first end and the clevis 04. The opposite end, or second end, of the swing arm 04 carries a mounting bar 05, the middle of the mounting bar being fixed perpendicularly to said second end of said swing arm 04. The mounting bar OS is designed to mount bird feeders or the like.

Between the first end and the second end of the swing arm 04 there is a protection panel 07. The panel 07 comprises a plate mounted perpendicularly to the axis of the swing arm 04, and may be permanently fixed to the swing arm 04, or may be selectively movable therealong.

From the foregoing description, it will be understood that the ground post 01 can be set in the ground to provide a support for the pole of the present invention. The swing arm can then be pivotally fixed to the second, or upper, end of the ground post. Bird feeders or the like can be mounted on the mounting bar 05, and the leverage means can be manipulated to raise or lower the mounting bar 05, hence the bird feeders or the like. The swing arm 04 may be in an upright position wherein the mounting bar and the second end of the swing arm are uppermost, or it may be in a down position wherein the mounting bar is near the ground. Since a person can grasp the leverage means and hold it during the complete range of motion of the swing arm, the person has complete control of the swing arm at all times.

In order to hold the swing arm 04 in the upright position, aligned holes in both the swing arm 04 and ground post 01 can receive a security push pin 02 through both holes to provide a locking means Other locking means for temporarily fixing the swing arm 04 to ground post 01 may be used and are well known in the art.

It will be obvious to those skilled in the art that numerous changes and modifications may be made, and the full use of equivalents resorted to, without departing from the spirit or scope of the invention as outlined in the appended claims.

What is claimed is:

1. A bird feeder pole comprising:

a sound post having first and second ends;

a swing arm having first and second ends;

said swing arm being rotatably mounted to said ground post by rotating means to allow said swing arm to be rotated with respect to said ground post for selectively positioning said swing arm generally coaxially with said ground post;

said swing arm including leverage means extending from said rotating means to said first end of said swing arm for rotating said swing arm; locking means for selectively fixing said leverage means to said ground post to retain said swing arm in an upright position;

a mounting bar generally at said second end for hanging a bird feeder;

said rotating means comprises a clevis;

said swing arm further comprises a protection panel fixed between said first end and said second end.

2. A bird feeder pole comprising:

a ground post with first and second ends;

a swing arm with first and second ends;

said swing arm further defining a hole that is approximately centered between said first end and said second end;

a clevis;

a pin through said clevis, said clevis being attached to said second end of said ground post;

said swing arm being pivotally attached by said pin of said clevis so as to allow said swing arm to be rotated with respect to said ground post;

said swing arm further comprising a mounting bar attached to said second end for hanging a bird feeder;

leverage means extending from said hole in said swing arm towards said first end;

locking means for selectively fixing said leverage means to said ground post to retain said swing arm in a fixed position;

said swing arm further comprises a protection panel fixed between said first end and said second end.

* * * * *